United States Patent [19]

Komoda

[11] Patent Number: 5,644,618
[45] Date of Patent: Jul. 1, 1997

[54] METHOD OF SELF-DIAGNOSING A MOBILE TELEPHONE SET FOR USE IN A MOBILE TELEPHONE SWITCHING SYSTEM AND A MOBILE TELEPHONE SET TO WHICH THE METHOD IS APPLIED

[75] Inventor: Motoyoshi Komoda, Tokyo, Japan

[73] Assignee: NEC Corporation, Japan

[21] Appl. No.: 889,856

[22] Filed: May 28, 1992

[30] Foreign Application Priority Data

May 31, 1991 [JP] Japan ............... 3-155346

[51] Int. Cl.⁶ ............... H04M 1/24; H04M 3/22; H04B 17/00; G01R 31/28
[52] U.S. Cl. ............... 379/27; 379/1; 379/32; 455/67.1; 455/67.4; 371/20.4
[58] Field of Search ............... 379/1, 27, 32, 379/58, 59, 63; 455/67.1, 67.4; 371/15.1, 20.4, 21.1, 21.2, 21.3

[56] References Cited

U.S. PATENT DOCUMENTS

| | | | |
|---|---|---|---|
| 4,354,251 | 10/1982 | Hellwig et al. | 364/900 |
| 4,558,416 | 12/1985 | Pauwels | 371/15 |
| 4,634,813 | 1/1987 | Hensley | 379/32 |
| 4,768,217 | 8/1988 | Asano et al. | 379/32 |
| 4,788,711 | 11/1988 | Nasco | 379/49 |
| 4,811,421 | 3/1989 | Havel et al. | 455/67.1 |
| 4,849,978 | 7/1989 | Dishon | 371/21 |
| 4,868,824 | 9/1989 | Golden | 371/20.4 |
| 4,964,156 | 10/1990 | Blair | 379/59 |
| 5,003,573 | 3/1991 | Agah et al. | 379/1 |
| 5,084,869 | 1/1992 | Russell | 370/85.7 |
| 5,101,409 | 3/1992 | Hack | 371/21.2 |
| 5,129,098 | 7/1992 | McGirr et al. | 455/67.1 |
| 5,134,643 | 7/1992 | Iwata | 379/27 |
| 5,179,723 | 1/1993 | Komoda | 455/67.4 |
| 5,257,388 | 10/1993 | Hayamizu | 371/21.2 |
| 5,263,152 | 11/1993 | Smith et al. | 371/21.2 |
| 5,274,648 | 12/1993 | Eikill et al. | 371/21.2 |
| 5,289,178 | 2/1994 | Schwendeman | 371/20.4 |
| 5,347,270 | 9/1994 | Matsuda | 371/20.4 |

FOREIGN PATENT DOCUMENTS

| | | |
|---|---|---|
| 127002 | 5/1984 | European Pat. Off. . |
| 297507 | 6/1988 | European Pat. Off. . |

Primary Examiner—Stella Woo
Assistant Examiner—Vijay Shankar
Attorney, Agent, or Firm—Ostrolenk, Faber, Gerb & Soffen, LLP

[57] ABSTRACT

A self-diagnosing method that shortens the diagnosing time for a ROM, which is provided within a mobile telephone set for use in a mobile telephone switching system, and the method being applied to a mobile telephone set. When the power supply is turned ON, data which is stored within a specific address of the ROM (ROMCHK), having a complementary value which complements the sum of data stored within all the addresses of the ROM to provide a certain specific value, is compared with data which was previously stored within a specific address of the non-volatile memory (NVMCHK), having the same value as the ROMCHK. If the contents of the two data do not coincide, then the content of the data within the entire area of the ROM is calculated for the diagnosis. In this case, the content stored within the specific address of the ROM is the sum of the data values within the entire area of the ROM, and the content stored within the specific address of the non-volatile memory is the same as this sum value.

11 Claims, 2 Drawing Sheets

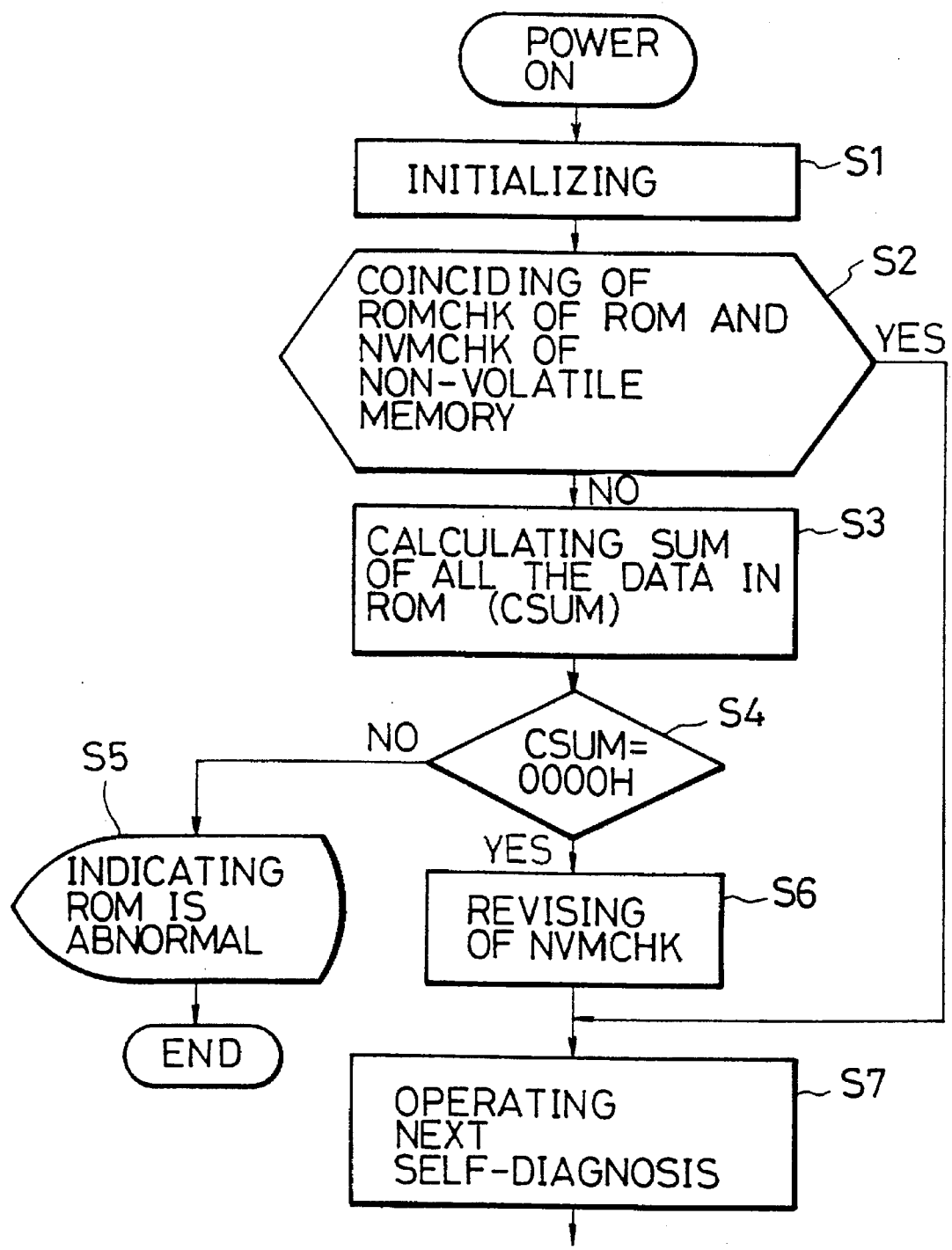

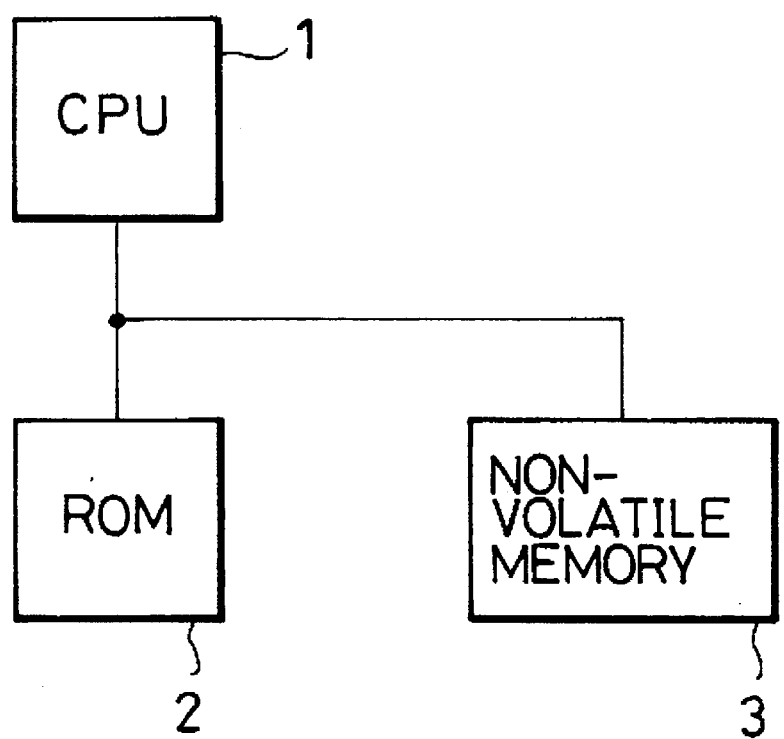

METHOD OF SELF-DIAGNOSING A MOBILE TELEPHONE SET FOR USE IN A MOBILE TELEPHONE SWITCHING SYSTEM AND A MOBILE TELEPHONE SET TO WHICH THE METHOD IS APPLIED

BACKGROUND OF THE INVENTION

1. Field of the Invention

The present invention relates to a method of self-diagnosing a mobile telephone set for use in a mobile telephone switching system, and particularly to a method of self-diagnosing a read-only memory (hereinafter referred to as ROM) which is provided within the mobile telephone set.

2. Description of the Related Art

In mobile telephone sets, various self-diagnoses are carried out when the power supply is turned ON. The reliability of mobile telephone sets is improved by preventing their use unless the mobile telephone sets are determined to be normal as a result of the self-diagnoses. The self-diagnoses include a diagnosis for a ROM provided within the telephone sets, which must be carried out without fail. In this case, the contents of all the addresses of the ROM are read out to carry out operations such as summing up or logic calculus exclusive OR. If each operational result turns out to be a value previously calculated, then the content of the ROM are determined to be normal, while, if not, then it is determined that something abnormal exists within the contents of the ROM and the user is informed of that fact.

Incidentally, in recent mobile telephone sets, as the program size of the man-machine interface portion has been increased in order to achieve various functions, the capacity of the ROM has been correspondingly increased from 512 kbits to 1 Mbit. As a result, there has arisen a problem in that it takes a long time for diagnosis if, each time the power supply is turned ON, the contents of all the addresses of the ROM are read out for operation, and the result of this operation is compared with a specific value so as to diagnose the ROM. For example, a typical eight-bit microprocessor (hereinafter referred to as a CPU) takes about 1 to 2 seconds for the diagnosis. Accordingly, takes about 1 to 2 seconds until the telephone set becomes operable after the power supply is turned ON, which could cause irritation to the user and, therefore, results in a serious problem so as to impair the reputation of the mobile telephone switching system. In addition, as a result of the time period required for diagnosis, since the telephone set cannot be tested for about 1 to 2 seconds after the power supply is turned ON, the number of man-hours required for inspection is increased thereby resulting in an increase in manufacturing cost for the manufacturer.

SUMMARY OF THE INVENTION

Accordingly, an object of the present invention is to provide a method of shortening the self-diagnosing time of a mobile telephone set.

Further, another object of the present invention is to provide a method of self-diagnosing to make the mobile telephone set available for use immediately after the power supply is turned ON.

Still another object of the present invention is to provide a method of self-diagnosing to make the mobile telephone set available for inspection immediately after the power supply is turned ON at the inspection stage during manufacture.

In order to achieve the objects described above, the self-diagnosing method of the present invention comprises steps to compare the content of data stored within a specific address of the ROM with that stored within a specific address of a non-volatile memory when the power supply is turned ON: to determine whether the ROM is normal or not by comparing whether the two contents of data in the specific addresses coincide with each other, and to calculate the data stored within all the addresses of the ROM according to a predetermined calculus to compare its result with the initially calculated result when the two contents of the data in the specific addresses do not coincide. The content of the data stored within the specific address of the ROM may be the sum of the data stored within all the areas of the ROM, the value to complement the sum as a certain specific value, the result of the logical exclusive OR of the data stored within all the addresses of the ROM or the sum of the cyclic redundancy codes for each data within all the addresses of the ROM.

The above and other objects, features and advantages of the present invention will become apparent from the following description and the appended claims, taken in conjunction with the accompanying drawings.

A still further object of the invention is to provide a mobile telephone set having a method of shortening the self-diagnosing time.

In order to achieve the object described above, the mobile telephone set comprises first memory means having a plurality of memory locations in each of which data are to be stored, second memory means having a specific memory location in which data are to be stored, means for comparing first data stored in one of the plurality of memory locations with second data stored in the specific memory location, calculation means for making a calculation on all data stored in the plurality of memory locations when the first and second data do not coincide each other, to produce a calculation result, means for comparing the calculation result with a predetermined value and means for indicating the first memory means to be abnormal when the calculation result differs from the predetermined value.

Further, the calculation means for making a calculation on all data stored in the plurality of memory locations may be means for summing all data stored in the plurality of memory locations to produce the sum of the all data as the calculation result, the first memory means may comprise a read only memory (ROM) and the second memory means may comprise a non-volatile memory in the mobile telephone set according to the invention described above.

BRIEF DESCRIPTION OF THE DRAWINGS

FIG. 1 is a flowchart of a specific embodiment of a self-diagnosing method for the mobile telephone set according to the present invention; and FIG. 2 is a block diagram of the mobile telephone set to which the self-diagnosing method according to the present invention shown in FIG. 1 is applied.

DESCRIPTION OF THE PREFERRED EMBODIMENT

A specific embodiment of the present invention is hereinafter described with reference to the accompanying drawings.

FIG. 2 is a block diagram of the essential portion of a mobile telephone set to which the self-diagnosing method according to the present invention shown in FIG. 1 is applied. This mobile telephone set comprises CPU 1, ROM 2 and non-volatile memory 3.

Any arbitrary content of ROM 2 can be written into any arbitrary address within non-volatile memory 3. CPU 1 determines whether the content of data stored within a specific address of ROM 2 and that of non-volatile memory 3 coincide by comparing them.

Based on this circuit arrangement, the diagnosing method according to the present invention is hereinafter described with reference to FIG. 1. At first, in step S1, the mobile telephone set is initialized. Next, in step S2, CPU 1 compares data stored within a specific address of the ROM 2 (hereinafter referred to as ROMCHK) with data stored within a specific address of the non-volatile memory 3 (hereinafter referred to as ROMCHK). The value of ROMCHK is the complementary data provided to set up the sum of the values of the data of all the addresses of ROM 2 as a certain specific value, for example, 0000H, which is assigned at the stage of factory inspection. NVMCHK is the same value as that described above, which is stored within non-volatile memory 3. In this case, the content of HVMCHK is previously written within the specific address of the non-volatile memory 3. If both contents coincide, then the ROM 2 is determined to be normal, after which the self-diagnosis proceeds to the next self-diagnosing operation step S7. If they do not coincide, the operation proceeds to step S3 deciding that some change has been added to the content of the ROM 2.

In step S3, the data values of all the addresses of ROM 2 are read out, and their sum is calculated as a checking sum (hereinafter referred to as CSUM). Step S4 is a process for determining whether the value of CSUM is equal to the value previously calculated and stored in another address of ROM 2, for example, 0000H and, if the CSUM is a value other than 0000H, then it is determined that something abnormal exists in the content of the ROM 2, and it is indicated to the user that the ROM 2 is abnormal in step S5. On the other hand, if the value of CSUM is 0000H, then it is determined that the content of ROM 2 is normal, and after revising the value of NVMCHK of the non-volatile memory 3 so as to be the same as the value of ROMCHK of ROM 2 in step S6, proceeds to carry out the next self-diagnosing operation step S7. Incidentally, although in this embodiment, a complementary value which complements to set up the sum of the data of all the area of the ROM as a predetermined value is compared in order to determine the validity of the ROM, the value may be that sum per se, the logical exclusive OR of the data within all the addresses of ROM 2 or the sum of the cyclic redundancy codes of the data within all the addresses of ROM 2.

While certain representative embodiments have been described for the purpose of illustrating the invention, it will be apparent to those skilled in the art that various changes and modifications may be made therein without departing from the spirit or scope of the invention.

What is claimed is:

1. A method of self-diagnosing a mobile telephone set for use in mobile telephone switching system by checking data stored in the mobile telephone set, the mobile telephone set comprising a read only memory (ROM) having said data to be checked stored therein, a non-volatile memory having reference binary data stored therein, and a microprocessor, said reference binary data, representing an initially calculated result of all binary data stored in the ROM calculated according to a predetermined calculus, the method comprising the steps of:

(a) comparing the data to be checked stored within a specific address of said ROM with the reference binary data stored within a specific address of said non-volatile memory when the power supply is turned ON;

(b) calculating a result of all binary data stored in said ROM according to said predetermined calculus when said data stored in the specific addresses of the ROM and non-volatile memory, respectively, do not coincide in step (a); and (c) indicating an abnormality of said ROM when said result calculated in step (b) differs from the data stored in the specific address of the non-volatile memory.

2. The method of self-diagnosing a mobile telephone set described in claim 1 wherein the data stored within the specific address of said ROM is a sum of the data values stored within all the addresses of said ROM, and the data stored within the specific address of said non-volatile memory has the same value as said sum.

3. The method of self-diagnosing a mobile telephone set described in claim 1 wherein data stored within the specific address of said ROM is a calculation result of exclusive OR of the data stored within all the addresses of said ROM, and the data stored within the specific address of said non-volatile memory has the same value as the result of the exclusive OR.

4. The method of self-diagnosing a mobile telephone set described in claim 1 wherein the data stored within the specific address of the ROM is a sum of the cyclic redundancy codes of the data stored within all the addresses of said ROM, and the data stored within the specific address of said non-volatile memory has the same value as said sum.

5. The method of self-diagnosing a mobile telephone set described in claim 1 wherein the data stored within the specific address of said ROM is a complementary value which complements to set up a sum of the data stored within all the addresses of said ROM as a certain specific value, and the data stored within the specific address of said non-volatile memory has the same value as said complementary value.

6. An apparatus comprising:

first memory means having a plurality of memory locations in each of which data are to be stored;

second memory means having a specific memory location in which data are to be stored;

means for comparing first data stored in one of said plurality of memory locations of said first memory means with second data stored in said specific memory location of said second memory means;

calculation means for making a calculation according to a predetermined calculus on all data stored in said plurality of memory locations of said first memory means when said first and second data do not coincide with each other, to produce a calculation result;

means for comparing said calculation result with the second data in said second memory means; and means for indicating said first memory means to be abnormal when said calculation result differs from said second data in said second memory means.

7. An apparatus as claimed in claim 6, wherein said calculation means comprises means for summing all data stored in said plurality of memory locations of said first memory means to produce a sum of all the data as said calculation result.

8. An apparatus as claimed in claim 6, wherein said first memory means comprises a read only memory (ROM), and wherein said second memory means comprises a non-volatile memory.

9. The method of self-diagnosing a mobile telephone set described in claim 1, further comprising the step of:

revising said data stored within the specific address of said non-volatile memory so as to be the same as the data stored within the specific address of said ROM when the result calculated in step (b) coincides with the data stored within the specific address of said non-volatile memory.

10. An apparatus as claimed in claim 6, further comprising means for revising said second data stored in said specific memory location of said second memory means so as to be the same as the first data stored in one of said plurality of memory locations of said first memory means when said calculation result coincides with said second data in said second memory means.

11. An apparatus as claimed in claim 6, wherein said second data represents an initially calculated result of all data stored in said plurality of memory locations of said first memory means calculated according to the predetermined calculus.

* * * * *